(12) United States Patent
Akiyama (10) Patent No.: US 8,836,492 B2
(45) Date of Patent: Sep. 16, 2014

(54) DRIVING SUPPORT APPARATUS AND DRIVING SUPPORT METHOD

(75) Inventor: Tomonori Akiyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 24 days.

(21) Appl. No.: 13/825,857

(22) PCT Filed: Sep. 29, 2011

(86) PCT No.: PCT/IB2011/002271
§ 371 (c)(1),
(2), (4) Date: Mar. 25, 2013

(87) PCT Pub. No.: WO2012/042358
PCT Pub. Date: Apr. 5, 2012

(65) Prior Publication Data
US 2013/0187772 A1    Jul. 25, 2013

(30) Foreign Application Priority Data
Oct. 1, 2010   (JP) .................................. 2010-224155

(51) Int. Cl.
*B60Q 1/00*       (2006.01)
*B60Q 9/00*       (2006.01)
*B62D 15/02*      (2006.01)
*B60W 50/14*      (2012.01)
*B60W 30/18*      (2012.01)
*B60W 30/095*     (2012.01)
*B60W 50/00*      (2006.01)

(52) U.S. Cl.
CPC .............. *B60Q 9/008* (2013.01); *B62D 15/025* (2013.01); *B60W 2420/42* (2013.01); *B60W 2520/10* (2013.01); *B60W 50/14* (2013.01); *B60W 30/18145* (2013.01); *B60W 2550/146* (2013.01); *B60W 30/0956* (2013.01); *B60W 30/0953* (2013.01); *B62D 15/0265* (2013.01); *B60W 2050/0085* (2013.01)
USPC ......................................................... 340/436

(58) Field of Classification Search
USPC ............ 340/436, 439, 576, 437, 438; 701/70, 701/72, 301
See application file for complete search history.

(56) References Cited

U.S. PATENT DOCUMENTS

| 6,138,062 | A  |   | 10/2000 | Usami |  |
|---|---|---|---|---|---|
| 6,278,362 | B1 | * | 8/2001 | Yoshikawa et al. | 340/439 |
| 6,487,475 | B1 | * | 11/2002 | Yoshikawa | 701/1 |
| 7,571,053 | B2 | * | 8/2009 | Ishikura | 701/301 |

(Continued)

FOREIGN PATENT DOCUMENTS

| DE | 10 2005 052 0 | 5/2007 |
|---|---|---|
| EP | 1 688 295 A2 | 8/2006 |

(Continued)

*Primary Examiner* — Phung Nguyen
(74) *Attorney, Agent, or Firm* — Oliff PLC (57) ABSTRACT

A driving support apparatus that sets a running road, on which a vehicle is able to run, on the basis of a road marking that indicates a lane boundary or a prohibited area and that, when the vehicle deviates from the running road, issues a warning or performs assisting so as to cause the vehicle to run within the running road changes a determination criterion, based on which a warning is issued or assisting is performed so as to cause the vehicle to run within the running road, on the basis of a degree of curve of the running road.

5 Claims, 6 Drawing Sheets (56) References Cited

U.S. PATENT DOCUMENTS

| | | | |
|---|---|---|---|
| 2005/0046579 A1* | 3/2005 | Oyama | 340/575 |
| 2005/0273261 A1* | 12/2005 | Niwa et al. | 701/301 |
| 2008/0091318 A1 | 4/2008 | Deng et al. | |
| 2010/0002911 A1 | 1/2010 | Wu et al. | |
| 2010/0004821 A1 | 1/2010 | Buerkle et al. | |
| 2010/0100284 A1* | 4/2010 | Kudo et al. | 701/42 |
| 2010/0145575 A1 | 6/2010 | Switkes et al. | |
| 2011/0022317 A1* | 1/2011 | Okita | 701/301 |

FOREIGN PATENT DOCUMENTS

| | | |
|---|---|---|
| EP | 1 840 000 A2 | 10/2007 |
| EP | 2 052 949 | 4/2009 |
| JP | A-08-016997 | 1/1996 |
| JP | 10-31799 | 2/1998 |
| JP | 2000-215396 | 8/2000 |
| JP | A-2010-205117 | 9/2010 |

* cited by examiner

WHEN CURVATURE RADIUS OF RUNNING ROAD IS LARGE

FIG. 2B

WHEN CURVATURE RADIUS OF RUNNING ROAD IS SMALL

DRIVING SUPPORT APPARATUS AND DRIVING SUPPORT METHOD

BACKGROUND OF THE INVENTION

1. Field of the Invention

The invention relates to a driving support apparatus and a driving support method.

2. Description of Related Art

There has been disclosed a technique by which, when two white lines on a road have been detected as road markings that indicate lane boundaries, steering of a vehicle is controlled on the basis of these two white lines; whereas, when white lines cannot be detected, steering of the vehicle is controlled on the basis of distances to side walls (for example, see Japanese Patent Application Publication No. 10-031799 (JP-A-10-031799)). With the technique described in JP-A-10-031799, even when there is a thin spot or a break in white lines, it is possible to maintain control over steering of the vehicle on the basis of distances to side walls.

Incidentally, when the degree of curve of a running road on which a vehicle runs is large, a driver feels a collision risk on the basis of a distance or arrival allowance time to an object in the widthwise direction of the vehicle. On the other hand, when the degree of curve of a running road is small, the driver feels a collision risk on the basis of a distance or arrival allowance time to an object in the traveling direction of the vehicle. Therefore, in order to support driving without making the driver feel a collision risk as much as possible, it is necessary to change a determination criterion based on which running is supported in response to the degree of curve of a running road.

SUMMARY OF THE INVENTION

The invention provides a technique for issuing a warning or performing assisting so as to cause a vehicle to run within a running road in line with a collision risk felt by the driver.

A first aspect of the invention provides a driving support apparatus. The driving support apparatus that sets a running road, on which a vehicle is able to run, on the basis of a road marking that indicates a lane boundary or a prohibited area and that, when the vehicle deviates from the running road, issues a warning or performs assisting so as to cause the vehicle to run within the running road changes a determination criterion, based on which a warning is issued or assisting is performed so as to cause the vehicle to run within the running road, on the basis of a degree of curve of the running road.

According to the first aspect of the invention, the determination criterion, based on which a warning is issued or assisting is performed so as to cause the vehicle to run within the running road, is changed on the basis of a degree of curve of the running road, so whatever is the degree of curve of the running road, it is possible to issue a warning or perform assisting so as to cause the vehicle to run within the running road in line with a collision risk felt by a driver.

Here, the degree of curve of the running road may be a curvature radius, or the like, of the running road. Here, the road marking that indicates a lane boundary may be a line such as a white line, a yellow line and a dotted line, a median strip or a divider such as a raised marker and an illuminator, a boundary between a roadway and an area other than the roadway such as a boundary between asphalt and gravel, or the like, on a road surface. The prohibited area may be an obstacle, such as a side wall, a curb, a pedestrian, a bicycle and another vehicle, or an area, such as a gutter and a step, that has a difference in height from a vehicle running plane. The prohibited area not only includes an area in which a vehicle is not able to run but also an area in which a vehicle is not allowed to run and an area in which a vehicle is not desired to run.

The driving support apparatus may select and use any one of a distance or arrival allowance time to a boundary of the running road in a widthwise direction of the vehicle and a distance or arrival allowance time to a boundary of the running road in a traveling direction of the vehicle as the determination criterion based on which a warning is issued or assisting is performed so as to cause the vehicle to run within the running road.

According to the aspect of the invention, the determination criterion, based on which a warning is issued or assisting is performed so as to cause the vehicle to run within the running road in accordance with an object (or direction) that the driver feels a collision risk and that varies in response to the degree of curve of the running road, is changed, so, whatever is the degree of curve of the running road, it is possible to issue a warning or perform assisting so as to cause the vehicle to run within the running road in line with a collision risk felt by the driver.

When the degree of curve of the running road is large, the driving support apparatus may use a distance or arrival allowance time to a boundary of the running road in a widthwise direction of the vehicle as the determination criterion based on which a warning is issued or assisting is performed so as to cause the vehicle to run within the running road; whereas, when the degree of curve of the running road is small, the driving support apparatus may use a distance or arrival allowance time to a boundary of the running road in a traveling direction of the vehicle as the determination criterion based on which a warning is issued or assisting is performed so as to cause the vehicle to run within the running road.

When the degree of curve of a running road is large, a driver feels a collision risk on the basis of a distance or arrival allowance time to an object in the widthwise direction of the vehicle. On the other hand, when the degree of curve of a running road is small, the driver feels a collision risk on the basis of a distance or arrival allowance time to an object in the traveling direction of the vehicle. According to the aspect of the invention, the determination criterion, based on which a warning is issued or assisting is performed so as to cause the vehicle to run within the running road in accordance with an object (or direction) that the driver feels a collision risk and that varies when the degree of curve of the running road is large or small, is changed, so, whatever is the degree of curve of the running road, it is possible to issue a warning or perform assisting so as to cause the vehicle to run within the running road in line with a collision risk felt by the driver.

The driving support apparatus may change the determination criterion, based on which a warning is issued or assisting is performed so as to cause the vehicle to run within the running road, on the basis of a width of the running road.

According to the aspect of the invention, the determination criterion, based on which a warning is issued or assisting is performed so as to cause the vehicle to run within the running road, is changed on the basis of the width of the running road, so it is possible to issue a warning or perform assisting so as to cause the vehicle to run within the running road in line with a collision risk felt by a driver.

A second aspect of the invention provides a driving support method. The driving support method includes: setting a running road, on which a vehicle is able to run, on the basis of a road marking that indicates a lane boundary or a prohibited area; issuing a warning or performing assisting so as to cause the vehicle to run within the running road when the vehicle deviates from the running road; and changing a determination criterion, based on which a warning is issued or assisting is performed so as to cause the vehicle to run within the running road, on the basis of a degree of curve of the running road.

According to the second aspect of the invention, the determination criterion, based on which a warning is issued or assisting is performed so as to cause the vehicle to run within the running road, is changed on the basis of a degree of curve of the running road, so whatever is the degree of curve of the running road, it is possible to issue a warning or perform assisting so as to cause the vehicle to run within the running road in line with a collision risk felt by a driver.

According to the aspects of the invention, it is possible to issue a warning or perform assisting so as to cause a vehicle to run within a running road in line with a collision risk felt by the driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a specific embodiment of the invention will be described. Here, a driving support apparatus that recognizes a lane or a prohibited area to set a running road of a vehicle and executes driving support process for preventing a deviation of the vehicle from the set running road will be described. Note that the driving support process is executed earlier than collision mitigation process that is executed when the vehicle stops in an emergency or when a collision between the vehicle and an obstacle is unavoidable. In addition, the configuration described in the following embodiment shows one embodiment of the invention and does not limit the configuration of the aspect of the invention.

Figure 1:
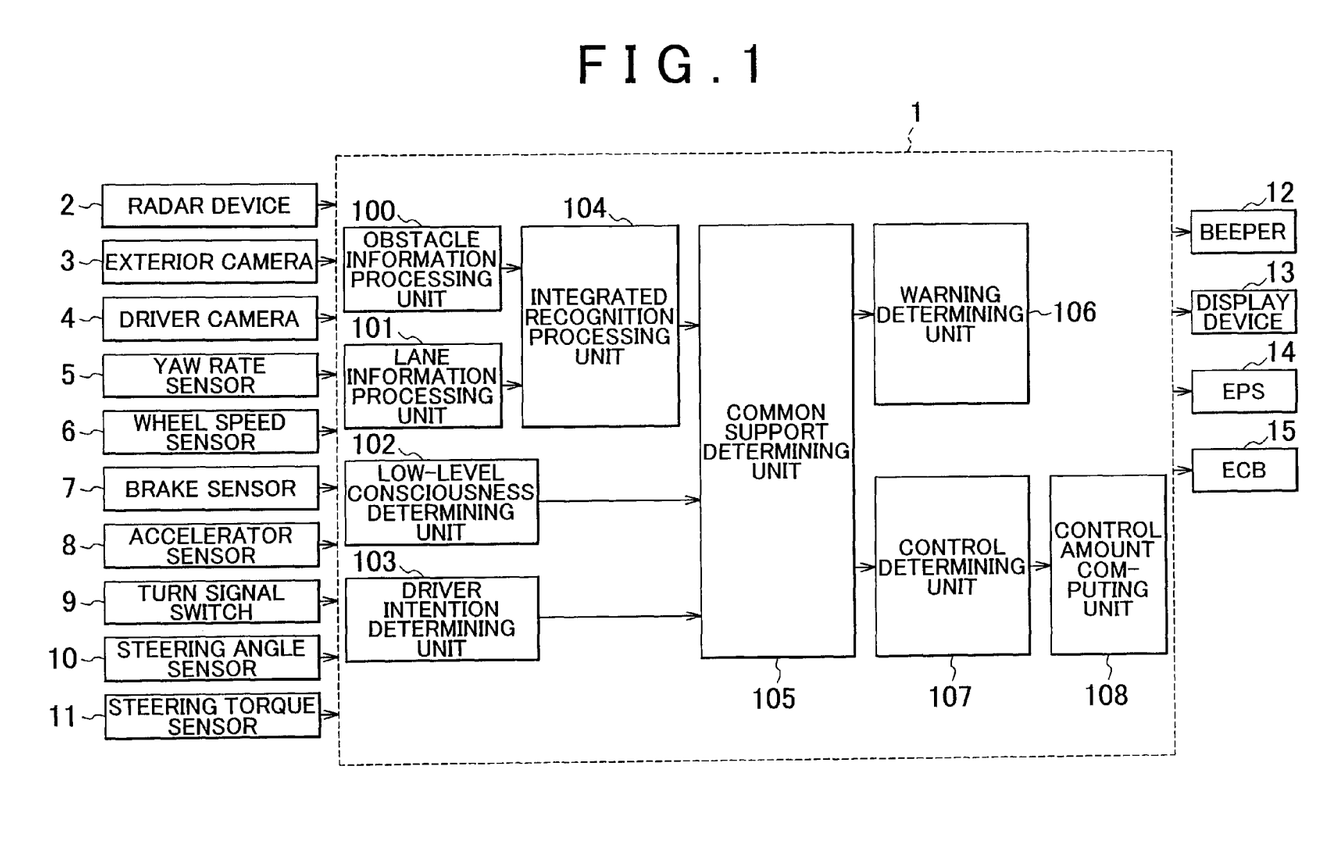
FIG. 1 is a block diagram that shows the configuration of a driving support apparatus according to a first embodiment of the invention function by function.

FIG. 1 is a block diagram that shows the configuration of a driving support apparatus according to a first embodiment of the invention function by function. As shown in FIG. 1, the vehicle is equipped with an electronic control unit (ECU) 1 for driving support.

The ECU 1 is an electronic control unit that includes a CPU, a ROM, a RAM, a back-up RAM, an I/O interface and the like. Various sensors, such as a radar device 2, an exterior camera 3, a driver camera 4, a yaw rate sensor 5, a wheel speed sensor 6, a brake sensor 7, an accelerator sensor 8, a turn signal switch 9, a steering angle sensor 10 and a steering torque sensor 11, are electrically connected to the ECU 1, and signals output from those sensors are input to the ECU 1.

The radar device 2 is attached to the front of the vehicle. The radar device 2 transmits a millimeter wave forward of the vehicle and then receives a reflected wave reflected from an obstacle outside the vehicle, thus outputting information about a relative position of the obstacle with respect to the vehicle (for example, coordinate information). The exterior camera 3 is arranged at a position inside a vehicle cabin at which a view ahead of the vehicle may be captured, and outputs an image ahead of the vehicle. The driver camera 4 is arranged at a position inside the vehicle cabin at which a driver may be captured, and outputs the image of the driver. The yaw rate sensor 5 is attached to a vehicle body, and outputs an electrical signal that correlates with the yaw rate of the vehicle. The wheel speed sensor 6 is attached to the wheel of the vehicle, and outputs an electrical signal that correlates with the running speed of the vehicle.

The brake sensor 7 is attached to a brake pedal inside the vehicle cabin, and outputs an electrical signal that correlates with the operation amount (depression force) of the brake pedal. The accelerator sensor 8 is attached to an accelerator pedal inside the vehicle cabin, and outputs an electrical signal that correlates with the operation amount (depression force) of the accelerator pedal. The turn signal switch 9 is attached to a turn signal lever inside the vehicle cabin. When the turn signal lever is operated, the turn signal switch 9 outputs an electrical signal that correlates with a direction indicated by a turn signal flasher (direction indicator). The steering angle sensor 10 is attached to a steering rod connected to a steering wheel inside the vehicle cabin, and outputs an electrical signal that correlates with a rotation angle of the steering wheel from a neutral position. The steering torque sensor 11 is attached to the steering rod, and outputs an electrical signal that correlates with torque input to the steering wheel (steering torque).

In addition, various devices, such as a beeper 12, a display device 13, an electric power steering (EPS) 14 and an electronically controlled brake (ECB) 15, are connected to the ECU 1, and those various devices are electrically controlled by the ECU 1.

The beeper 12 is a device that is attached inside the vehicle cabin and that outputs a warning sound, or the like. The display device 13 is a device that is attached inside the vehicle cabin and that displays various messages and warning lamps. The electric power steering (EPS) 14 is a device that utilizes torque generated by an electric motor to assist the steering wheel in operation. The electronically controlled brake (ECB) 15 is a device that electrically adjusts the hydraulic fluid pressure (brake fluid pressure) of a friction brake provided for each wheel.

The ECU 1 has the following functions in order to control various devices using signals output from the various sensors. That is, the ECU 1 includes an obstacle information processing unit 100, a lane information processing unit 101, a low-level consciousness determining unit 102, a driver intention determining unit 103, an integrated recognition processing unit 104, a common support determining unit 105, a warning determining unit 106, a control determining unit 107 and a control amount computing unit 108.

The obstacle information processing unit 100 approximately obtains a regression line, by which a plurality of prohibited areas may be avoided, on the basis of pieces of coordinate information of the plurality of prohibited areas, such as obstacles, output from the radar device 2, and generates the coordinate information of the regression line and information including the yaw angle, or the like, of the vehicle with respect to the regression line. In addition, when a single prohibited area, such as an obstacle, has been detected by the radar device 2, the obstacle information processing unit 100 also generates the coordinate information of the prohibited area and information about the yaw angle of the vehicle with respect to the prohibited area. Note that the obstacle information processing unit 100 may generate information about a prohibited area on the basis of an image captured by the exterior camera 3. The prohibited area may be an obstacle, such as a side wall, a curb, a pedestrian, a bicycle and another vehicle, or an area, such as a gutter and a step, that has a difference in height from a vehicle running plane. The prohibited area not only includes an area in which a vehicle is not able to run but also an area in which a vehicle is not allowed to run and an area in which a vehicle is not desired to run.

The lane information processing unit 101 generates information about a lane and information about the attitude of the vehicle with respect to the lane on the basis of an image captured by the exterior camera 3. The information about a lane is information about a road marking that indicates a lane boundary or information about the width of a lane, defined by the road marking. The road marking that indicates a lane boundary may be a line such as a white line, a yellow line and a dotted line, a median strip or a divider such as a raised marker and an illuminator, a boundary between a roadway and an area other than the roadway such as a boundary between asphalt and gravel, or the like, on a road surface. The information about the attitude of the vehicle with respect to a lane is information about a distance between the vehicle and a road marking that indicates a lane boundary, information about the offset amount of a vehicle position with respect to a lane center and information about the yaw angle of a vehicle traveling direction with respect to a road marking that indicates a lane boundary. Note that when the vehicle is equipped with a navigation system, the lane information processing unit 101 may generate information about a lane from map information and GPS information that the navigation system has.

The low-level consciousness determining unit 102 determines the degree of decrease in the consciousness level (arousal level) of a driver on the basis of an image captured by the driver camera 4. The low-level consciousness determining unit 102 computes a driver's eye closure time and eye closure frequency from an image captured by the driver camera 4, and determines that the consciousness level of the driver is low (the arousal level is low) when the eye closure time or the eye closure frequency exceeds an upper limit. In addition, the low-level consciousness determining unit 102 may compute a period of time during which the orientation of the face or eyes of the driver deviates from the vehicle traveling direction from the image captured by the driver camera 4, and may determine that the driver drives the vehicle inattentively when the calculated period of time exceeds an upper limit.

The driver intention determining unit 103 determines whether a variation in the operation amount of the brake pedal, a variation in the operation amount of the accelerator pedal or a variation in the operation (steering) amount of the steering wheel is due to a driver's intention on the basis of signals output from the wheel speed sensor 6, the brake sensor 7, the accelerator sensor 8, the turn signal switch 9, the steering angle sensor 10 and the steering torque sensor 11.

The integrated recognition processing unit 104 sets a running road on which the vehicle is able to run on the basis of the information generated by the obstacle information processing unit 100 and the information generated by the lane information processing unit 101, and obtains the yaw angle of the vehicle with respect to a running road boundary and the offset amount of the vehicle with respect to the running road center. Note that, on a road having a narrow lane width, the driver may be forced to drive the vehicle to deviate from the lane. In contrast to this, on a road having a narrow lane width, the integrated recognition processing unit 104 may set a running road so as to deviate from a road marking on the basis of information about the road marking that indicates a lane boundary and information about a prohibited area present around the lane. That is, the integrated recognition processing unit 104 may set a temporary running road, which deviates from a road marking that indicates a lane boundary, on the basis of the road marking and may set a regular running road, which deviates from the road marking, on the basis of the temporary running road and the prohibited area. In addition, when the integrated recognition processing unit 104 receives information about a single prohibited area from the obstacle information processing unit 100, the integrated recognition processing unit 104 may extend the length of the prohibited area in parallel with a road to set a running road. That is, the integrated recognition processing unit 104 may recognize a prohibited area detected as a point on coordinates as a line on coordinates to set a running road. At this time, the amount of extension (the length of the line) may be longer when the signal output from the wheel speed sensor 6 (vehicle speed) is high or when the yaw angle of the vehicle with respect to the line is large than when the vehicle speed is low or when the yaw angle with respect to the line is small.

The common support determining unit 105 determines whether to execute driving support process on the basis of information generated by the integrated recognition processing unit 104, a result determined by the low-level consciousness determining unit 102 and a result determined by the driver intention determining unit 103. The common support determining unit 105 allows executing driving support process when the low-level consciousness determining unit 102 determines that the level of consciousness of the driver is low or when the low-level consciousness determining unit 102 determines that the driver drives the vehicle inattentively. In addition, when the driver intention determining unit 103 determines that the driver performs intentional operation, the common support determining unit 105 limits execution of driving support process.

When the common support determining unit 105 allows executing driving support process, the warning determining unit 106 determines the sound timing at which the beeper 12 sounds and the display timing at which the display device 13 displays a warning message or a warning lamp. The details of the warning determining unit 106 will be described later.

Note that a method of warning the driver is not limited to sounding the beeper 12 or displaying a warning message or a warning lamp on the display device 13, a method of intermittently changing torque that fastens a seat belt may be, for example, employed.

When the common support determining unit 105 allows executing driving support process, the control determining unit 107 determines whether to activate the electric power steering (EPS) 14 or the electronically controlled brake (ECB) 15 in order to avoid a deviation from a running road. The details of the control determining unit 107 will be described later.

When the control determining unit 107 issues a request to activate the electric power steering (EPS) 14 or the electronically controlled brake (ECB) 15, the control amount computing unit 108 computes the control amount of the electric power steering (EPS) 14 or the control amount of the electronically controlled brake (ECB) 15, and activates the electric power steering (EPS) 14 or the electronically controlled brake (ECB) 15 in accordance with the calculated control amount. The control amount computing unit 108 computes a target yaw rate required to avoid a deviation from a running road using information generated by the integrated recognition processing unit 104, a signal output from the wheel speed sensor 6 (vehicle speed) and a signal output from the yaw rate sensor 5 (yaw rate) as parameters. More specifically, the control amount computing unit 108 computes a target yaw rate Ytrg through the following mathematical expression where a relative distance to a running road boundary is D, the speed of the vehicle (vehicle speed) is V and the yaw angle of the vehicle with respect to the running road boundary is θ.

$$Ytrg=(\theta \cdot V \sin \theta)/D$$

The control amount computing unit 108 obtains the control amount (steering torque) of the electric power steering (EPS) 14 and the control amount (brake hydraulic pressure) of the electronically controlled brake (ECB) 15 using the target yaw rate Ytrg as an argument. At this time, the correlation between a target yaw rate Ytrg and a steering torque and the correlation between a target yaw rate Ytrg and a brake hydraulic pressure may be mapped in advance. Note that, when the target yaw rate Ytrg is smaller than a predetermined value (the maximum value of yaw rate at which a running road deviation may be avoided only by steering), the brake hydraulic pressure of the electronically controlled brake (ECB) 15 may be set to 0. In addition, when different brake hydraulic pressures are respectively applied to friction brakes of right and left wheels of the vehicle at the time when the electronically controlled brake (ECB) 15 is activated, a yaw rate that interferes with the yaw rate generated by the electric power steering (EPS) 14 is generated. Therefore, it is desirable that equivalent brake hydraulic pressures are respectively applied to the friction brakes of the right and left wheels. Note that the control amount computing unit 108 not only activates the electric power steering (EPS) 14 or the electronically controlled brake (ECB) 15 with reference to a running road boundary but also may potentially recognize a running road boundary widely and increases the control amount of the electric power steering (EPS) 14 or the control amount of the electronically controlled brake (ECB) 15 as the direction deviates from a running road.

Note that a method of decelerating the vehicle is not limited to a method that uses the electronically controlled brake (ECB) 15 to activate the friction brakes; it may be a method of converting (regenerating) kinetic energy of the vehicle to electric energy or a method of changing the speed ratio of a transmission to increase engine brake.

With the above described driving support apparatus, it is possible to warn the driver of a deviation from a running road set on the basis of a prohibited area, such as an obstacle, and a lane and assist in operation for avoiding a running road deviation.

Figure 2A:
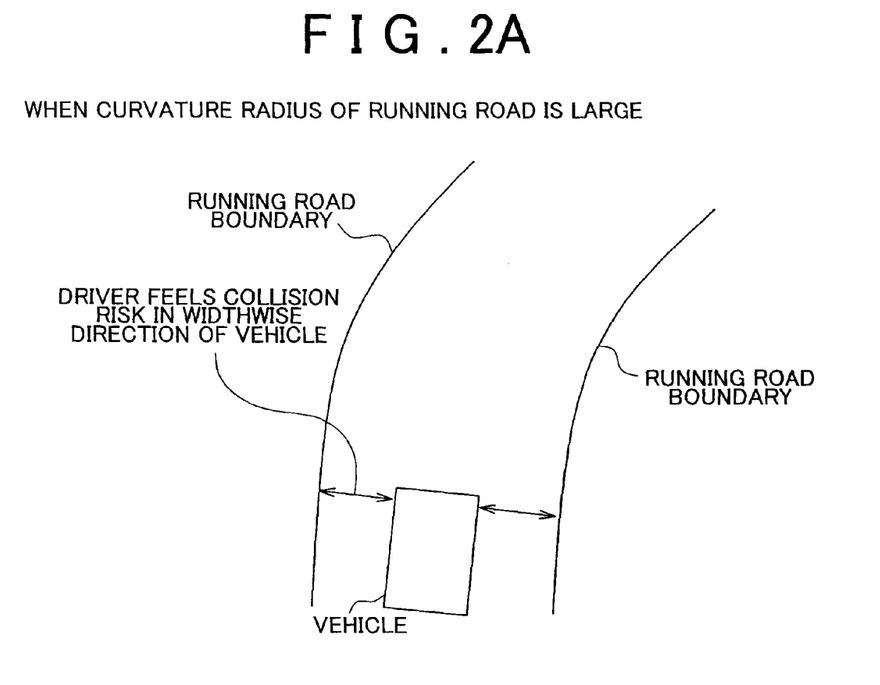
FIG. 2A and FIG. 2B are views that respectively show objects from which a driver feels a collision risk.
Figure 2B:
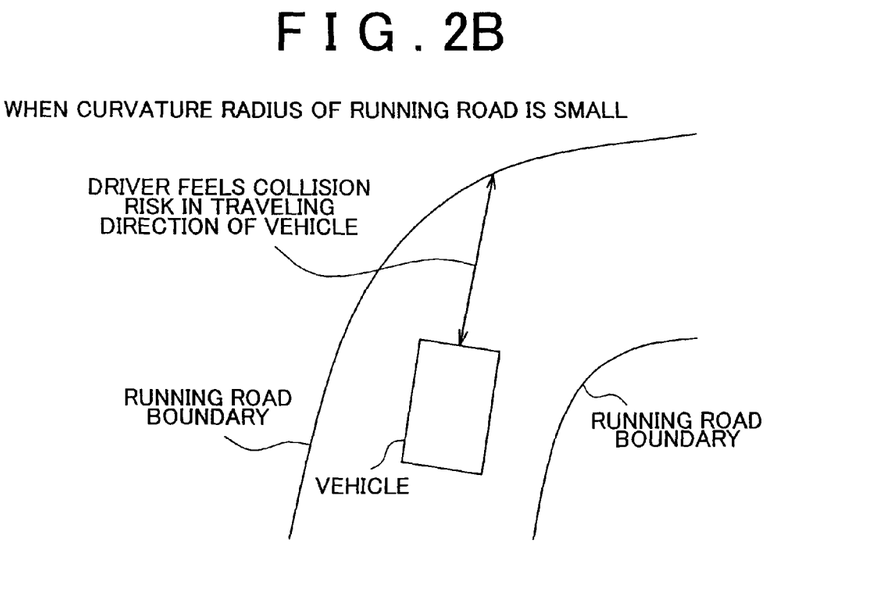

FIG. 2A and FIG. 2B are views that respectively show objects from which the driver feels a collision risk. FIG. 2A is a case where the curvature radius of a running road is large. FIG. 2B is a case where the curvature radius of a running road is small. When the curvature radius of the set running road is large as shown in FIG. 2A, the driver feels a collision risk on the basis of a distance or arrival allowance time to an object in the widthwise direction of the vehicle. On the other hand, when the set curvature radius of a running road is small as shown in FIG. 2B, the driver feels a collision risk on the basis of a distance or arrival allowance time to an object in the traveling direction of the vehicle. In addition, particularly, when the set running road width is narrow, the driver feels a distance or arrival allowance time to an object in the traveling direction of the vehicle. Therefore, in order to support the driver in driving without making the driver feel a collision risk as much as possible, it is necessary to change a determination criterion based on which running is supported in response to the curvature radius, or the like, of a running road.

Then, in the present embodiment, the warning determining unit 106 changes a determination criterion, based on which a warning is issued to cause the vehicle to run within a running road, on the basis of the curvature radius of the running road and the width of the running road.

Hereinafter, the function of the warning determining unit 106 according to the present embodiment will be described in detail.

When the common support determining unit 105 allows executing driving support process, the warning determining unit 106 determines the sound timing at which the beeper 12 sounds and the display timing at which the display device 13 displays a warning message or a warning lamp. Hereinafter, the sound timing at which the beeper 12 sounds and the display timing at which the display device 13 displays a warning message or a warning lamp, determined by the warning determining unit 106, are collectively termed warning timing. Such warning timing corresponds to when the vehicle deviates from a running road.

The warning determining unit 106 initially calculates the curvature radius R of the running road set by the integrated recognition processing unit 104 and also calculates the width H of the running road. Subsequently, it is determined whether the curvature radius R of the running road is smaller than or equal to a first threshold X1($m$) and the width H of the running road is smaller than or equal to a second threshold Y1($m$). Then, when the curvature radius R of the running road is not smaller than or equal to the first threshold X1($m$) or the width H of the running road is not smaller than or equal to the second threshold Y1($m$), the warning determining unit 106 determines to use a distance or arrival allowance time to a running road boundary in the widthwise direction of the vehicle as the determination criterion based on which a warning is issued to cause the vehicle to run within the running road. That is, a distance or arrival allowance time to a running road boundary in the widthwise direction of the vehicle as shown in FIG. 2A is used. On the other hand, when the curvature radius R of the running road is smaller than or equal to the first threshold X1($m$) and the width H of the running road is smaller than or equal to the second threshold Y1 ($m$), the warning determining unit 106 determines to use a distance or arrival allowance time to a running road boundary in the traveling direction of the vehicle as the determination criterion based on which a warning is issued to cause the vehicle to run within the running road. That is, a distance or arrival allowance time to the running road boundary in the traveling direction of the vehicle as shown in FIG. 2B is used. Here, the first threshold X1($m$) is a value by which the curvature radius of a running road is classified into any one of a large curvature radius and a small curvature radius, and is a value determined by an experiment, verification, or the like, in advance. The first threshold X1($m$) may be a fixed value or may be a variable value that varies in response to a vehicle speed, a yaw rate, or the like. The second threshold Y1($m$) is a value by which the width of a running road is classified into any one of a wide width and a narrow width, and is a value determined by an experiment, verification, or the like, in advance. The second threshold Y1($m$) may be a fixed value or may be a variable value that varies in response to a vehicle speed, a yaw rate, or the like. By so doing, when a distance or arrival allowance time to a running road boundary in the direction determined as any one of the widthwise direction of the vehicle and the traveling direction of the vehicle falls at or below a predetermined distance or time, the warning determining unit 106 determines the warning timing at which a warning is issued. When the warning timing is determined, a warning may be issued immediately after the determination or a warning may be issued after a lapse of a predetermined period of time from the determination.

Here, in order for the warning determining unit 106 to determine the warning timing, a predetermined distance or time, which is compared with a distance or arrival allowance time to a running road boundary in the direction determined as any one of the widthwise direction of the vehicle and the traveling direction of the vehicle, is a value that is changed in response to a signal output from the wheel speed sensor 6 (vehicle speed) or a signal output from the yaw rate sensor 5 (yaw rate). A predetermined distance is set to be longer or a predetermined time is set to be longer when the vehicle speed is high than when the vehicle speed is low. In addition, a predetermined distance is set to be longer or a predetermined time is set to be longer when the yaw rate is large than when the yaw rate is small.

In this way, the determination criterion, based on which a warning is issued to cause the vehicle to run within a running road, is changed on the basis of the curvature radius of the running road and the width of the running road, so, whatever are the curvature radius of the running road and the width of the running road, it is possible to issue a warning so as to cause the vehicle to run within the running road in line with a collision risk felt by the driver.

Note that the warning determining unit 106 not only sounds the beeper 12 or displays a warning message or a warning lamp on the display device 13 with reference to a running road boundary but also may potentially recognize a running road boundary widely and increases the sound level of the beeper 12 or increases the size of a warning message or a warning lamp on the display device 13 as the vehicle deviates from the running road.

Figure 3:
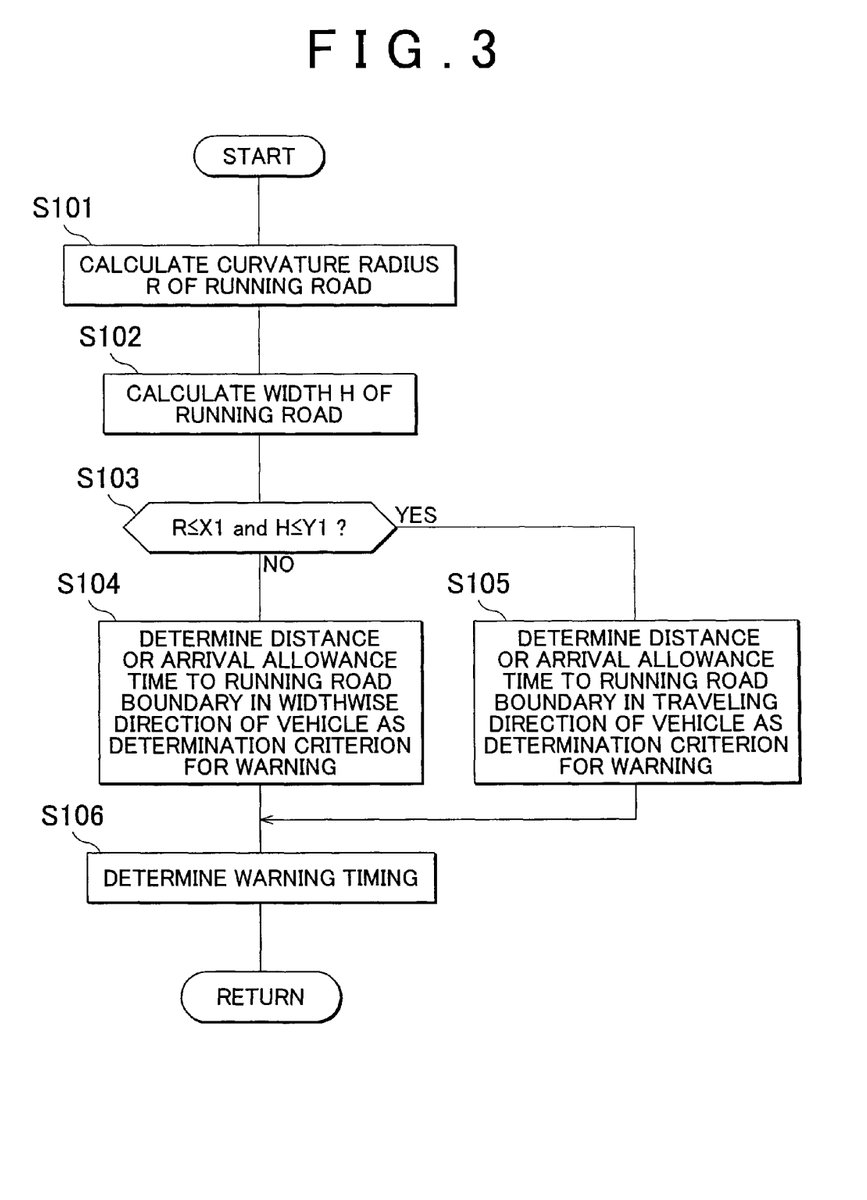
FIG. 3 is a flowchart that shows a first warning determination control routine according to the first embodiment.

A first warning determination control routine executed by the warning determining unit 106 will be described with reference to the flowchart shown in FIG. 3. FIG. 3 is a flowchart that shows the first warning determination control routine. The routine is repeatedly executed by the warning determining unit 106 of the ECU 1 at predetermined intervals.

As the routine shown in FIG. 3 is started, the curvature radius R of the running road set by the integrated recognition processing unit 104 is calculated in S101. In S102, the width H of the running road set by the integrated recognition processing unit 104 is calculated.

In S103, it is determined whether the curvature radius R of the running road is smaller than or equal to the first threshold X1($m$) and the width H of the running road is smaller than or equal to the second threshold Y1($m$). When it is determined in S103 that the curvature radius R of the running road is not smaller than or equal to the first threshold X1($m$) or the width H of the running road is not smaller than or equal to the second threshold Y1($m$), the process proceeds to S104. When it is determined in S103 that the curvature radius R of the running road is smaller than or equal to the first threshold X1($m$) and the width H of the running road is smaller than or equal to the second threshold Y1($m$), the process proceeds to S105.

In S104, it is determined to use a distance or arrival allowance time to a running road boundary in the widthwise direction of the vehicle as shown in FIG. 2A as the determination criterion based on which a warning is issued to cause the vehicle to run within the running road.

In S105, it is determined to use a distance or arrival allowance time to a running road boundary in the traveling direction of the vehicle as shown in FIG. 2B as the determination criterion based on which a warning is issued to cause the vehicle to run within the running road.

In S106, the warning timing is determined. The warning timing is determined to issue a warning when a distance or arrival allowance time to the running road boundary in the direction determined as any one of the widthwise direction of the vehicle and the traveling direction of the vehicle in any one of S104 and S105 is smaller than or equal to the predetermined distance or time.

According to the above described routine, a distance or arrival allowance time to the running road boundary in any one of the widthwise direction of the vehicle and the traveling direction of the vehicle is selected as the determination criterion, based on which a warning is issued to cause the vehicle to run within the running road, on the basis of the curvature radius of the running road and the width of the running road, so, whatever are the curvature radius of the running road and the width of the running road, it is possible to issue a warning so as to cause the vehicle to run within the running road in line with a collision risk felt by the driver.

The activation timing at which the control determining unit 107 activates the electric power steering (EPS) 14 or the electronically controlled brake (ECB) 15 may also be determined as in the case of the above described warning determination control.

That is, in the present embodiment, the control determining unit 107 changes a determination criterion based on which assisting is performed to cause the vehicle to run within a running road on the basis of the curvature radius of the running road and the width of the running road.

Hereinafter, the function of the control determining unit 107 according to the present embodiment will be described in detail.

When the common support determining unit 105 allows executing driving support process, the control determining unit 107 determines the activation timing at which the electric power steering (EPS) 14 or the electronically controlled brake (ECB) 15 is activated. Such activation timing corresponds to when the vehicle deviates from a running road.

The control determining unit 107 initially calculates the curvature radius R of the running road set by the integrated recognition processing unit 104 and also calculates the width H of the running road. Subsequently, it is determined whether the curvature radius R of the running road is smaller than or equal to a third threshold X2($m$) and the width H of the running road is smaller than or equal to a fourth threshold Y2($m$). Then, when the curvature radius R of the running road is not smaller than or equal to the third threshold X2($m$) or the width H of the running road is not smaller than or equal to the fourth threshold Y2($m$), the control determining unit 107 determines to use a distance or arrival allowance time to a running road boundary in the widthwise direction of the vehicle as the determination criterion based on which assisting is performed to cause the vehicle to run within the running road. That is, a distance or arrival allowance time to a running road boundary in the widthwise direction of the vehicle as shown in FIG. 2A is used. On the other hand, when the curvature radius R of the running road is smaller than or equal to the third threshold X2 ($m$) and the width H of the running road is smaller than or equal to the fourth threshold Y2 ($m$), the control determining unit 107 determines to use a distance or arrival allowance time to a running road boundary in the traveling direction of the vehicle as the determination criterion based on which assisting is performed to cause the vehicle to run within the running road. That is, a distance or arrival allowance time to the running road boundary in the traveling direction of the vehicle as shown in FIG. 2B is used. Here, the third threshold X2($m$) is a value by which the curvature radius of a running road is classified into any one of a large curvature radius and a small curvature radius, and is a value determined by an experiment, verification, or the like, in advance. The third threshold X2($m$) may be a fixed value or may be a variable value that varies in response to a vehicle speed, a yaw rate, or the like. The fourth threshold Y2($m$) is a value by which the width of a running road is classified into any one of a wide width and a narrow width, and is a value determined by an experiment, verification, or the like, in advance. The fourth threshold Y2($m$) may be a fixed value or may be a variable value that varies in response to a vehicle speed, a yaw rate, or the like. By so doing, when a distance or arrival allowance time to a running road boundary in the direction determined as any one of the widthwise direction of the vehicle and the traveling direction of the vehicle falls at or below a predetermined distance or time, the control determining unit 107 determines the activation timing at which assisting is performed. When the activation timing is determined, activation may be started with the control amount computed by the control amount computing unit 108 immediately after the determination or activation may be started with the control amount computed by the control amount computing unit 108 after a lapse of a predetermined period of time from the determination.

Here, in order for the control determining unit 107 to determine the activation timing, a predetermined distance or time, which is compared with a distance or arrival allowance time to a running road boundary in the direction determined as any one of the widthwise direction of the vehicle and the traveling direction of the vehicle, is a value that is changed in response to a signal output from the wheel speed sensor 6 (vehicle speed) or a signal output from the yaw rate sensor 5 (yaw rate) as in the case of the predetermined distance or predetermined time used by the warning determining unit 106. The predetermined distance is set to be longer or the predetermined time is set to be longer when the vehicle speed is high than when the vehicle speed is low. In addition, the predetermined distance is set to be longer or the predetermined time is set to be longer when the yaw rate is large than when the yaw rate is small. Furthermore, the predetermined distance or time used by the control determining unit 107 may be set so as to be shorter than the predetermined distance or predetermined time used by the warning determining unit 106.

In this way, the determination criterion, based on which assisting is performed to cause the vehicle to run within a running road, is changed on the basis of the curvature radius of the running road and the width of the running road, so, whatever are the curvature radius of the running road and the width of the running road, it is possible to perform assisting so as to cause the vehicle to run within the running road in line with a collision risk felt by the driver.

Figure 4:
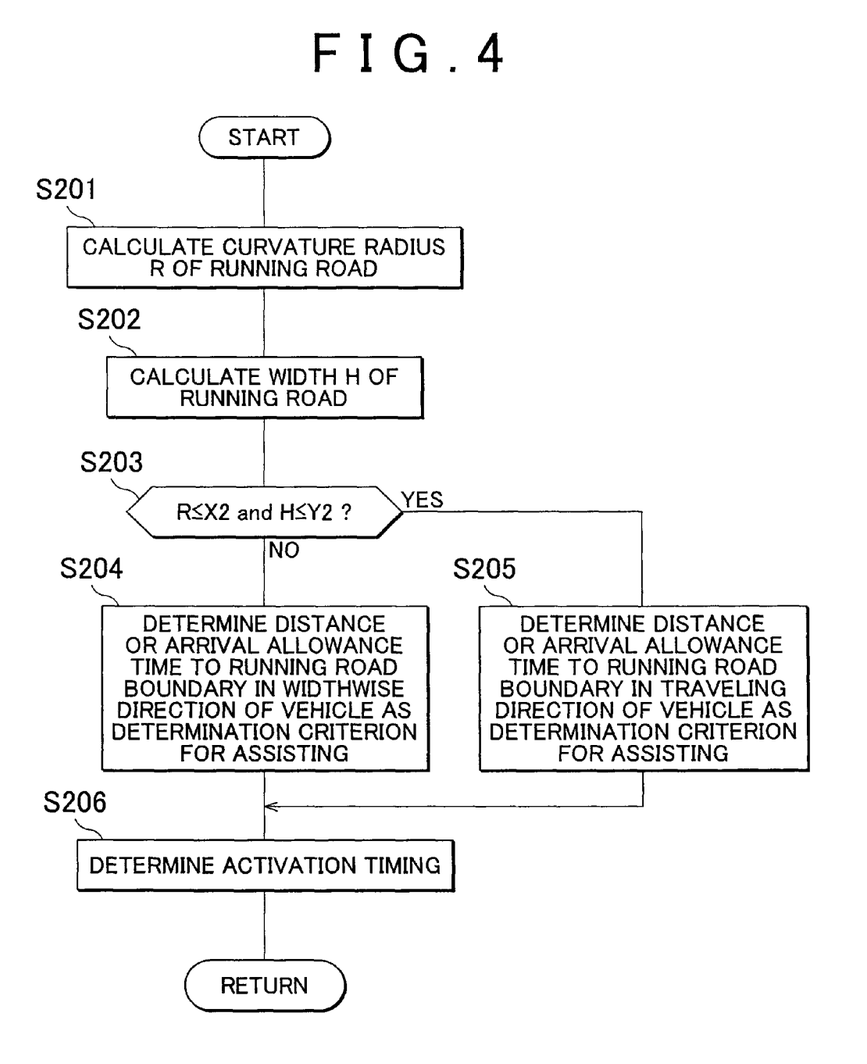
FIG. 4 is a flowchart that shows a first control determination control routine according to the first embodiment.

A first control determination control routine executed by the control determining unit 107 will be described with reference to the flowchart shown in FIG. 4. FIG. 4 is a flowchart that shows the first control determination control routine. The routine is repeatedly executed by the control determining unit 107 of the ECU 1 at predetermined intervals.

As the routine shown in FIG. 4 is started, the curvature radius R of the running road set by the integrated recognition processing unit 104 is calculated in S201. In S202, the width H of the running road set by the integrated recognition processing unit 104 is calculated.

In S203, it is determined whether the curvature radius R of the running road is smaller than or equal to the third threshold X2($m$) and the width H of the running road is smaller than or equal to the fourth threshold Y2($m$). When it is determined in S203 that the curvature radius R of the running road is not smaller than or equal to the third threshold X2($m$) or the width H of the running road is not smaller than or equal to the fourth threshold Y2($m$), the process proceeds to S204. When it is determined in S203 that the curvature radius R of the running road is smaller than or equal to the third threshold X2($m$) and the width H of the running road is smaller than or equal to the fourth threshold Y2($m$), the process proceeds to S205.

In S204, it is determined to use a distance or arrival allowance time to a running road boundary in the widthwise direction of the vehicle as shown in FIG. 2A as the determination criterion based on which assisting is performed to cause the vehicle to run within the running road.

In S205, it is determined to use a distance or arrival allowance time to a running road boundary in the traveling direction of the vehicle as shown in FIG. 2B as the determination criterion based on which assisting is performed to cause the vehicle to run within the running road.

In S206, the activation timing is determined. The activation timing is determined to perform activation when a distance or arrival allowance time to the running road boundary in the direction determined as any one of the widthwise direction of the vehicle and the traveling direction of the vehicle in any one of S204 and S205 is smaller than or equal to the predetermined distance or time.

According to the above described routine, a distance or arrival allowance time to the running road boundary in any one of the widthwise direction of the vehicle and the traveling direction of the vehicle is selected as the determination criterion, based on which assisting is performed to cause the vehicle to run within the running road, on the basis of the curvature radius of the running road and the width of the running road, so, whatever are the curvature radius of the running road and the width of the running road, it is possible to perform assisting so as to cause the vehicle to run within the running road in line with a collision risk felt by the driver.

In the first embodiment, the determination criterion based on which a warning is issued and the determination criterion based on which assisting is performed to cause the vehicle to run within a running road are changed on the basis of the curvature radius of the running road and the width of the running road. However, the aspect of the invention is not limited to this configuration. A collision risk felt by the driver is more influenced by a variation in the curvature radius of the running road than a variation in the width of the running road. In consideration of this fact, the determination criterion based on which a warning is issued and the determination criterion based on which assisting is performed to cause the vehicle to run within the running road may be changed on the basis of only the curvature radius of the running road.

Figure 5:
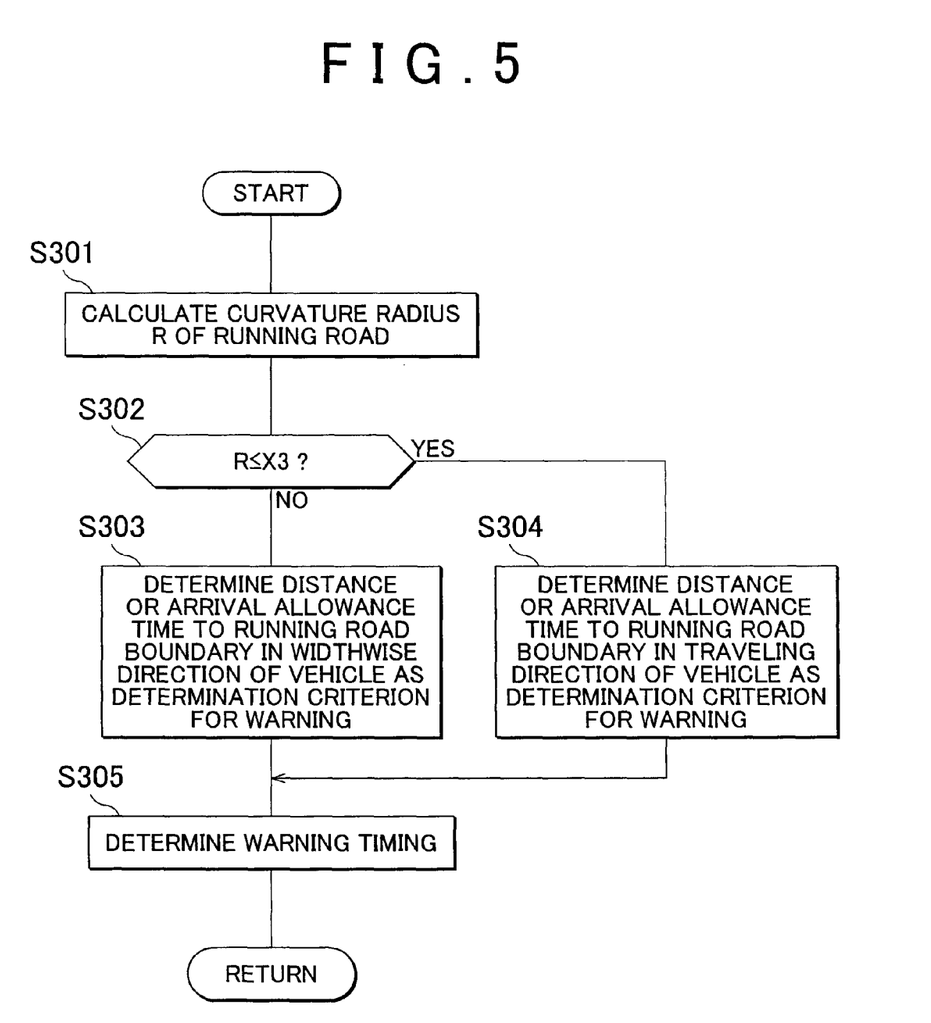
FIG. 5 is a flowchart that shows a second warning determination control routine according to an alternative embodiment.

A second warning determination control routine executed by the warning determining unit 106 will be described with reference to the flowchart shown in FIG. 5. FIG. 5 is a flowchart that shows the second warning determination control routine. The routine is repeatedly executed by the warning determining unit 106 of the ECU 1 at predetermined intervals.

As the routine shown in FIG. 5 is started, the curvature radius R of the running road set by the integrated recognition processing unit 104 is calculated in S301.

It is determined in S302 whether the curvature radius R of the running road is smaller than or equal to a fifth threshold X3($m$). Here, the fifth threshold X3($m$) is a value by which the curvature radius of a running road is classified into any one of a large curvature radius and a small curvature radius, and is a value determined by an experiment, verification, or the like, in advance. The fifth threshold X3($m$) may be a fixed value or may be a variable value that varies in response to a vehicle speed, a yaw rate, or the like. When it is determined in S302 that the curvature radius R of the running road is not smaller than or equal to the fifth threshold X3($m$), the process proceeds to S303. When it is determined in S302 that the curvature radius R of the running road is smaller than or equal to the fifth threshold X3($m$), the process proceeds to S304.

In S303, it is determined to use a distance or arrival allowance time to a running road boundary in the widthwise direction of the vehicle as shown in FIG. 2A as the determination criterion based on which a warning is issued to cause the vehicle to run within the running road.

In S304, it is determined to use a distance or arrival allowance time to a running road boundary in the traveling direction of the vehicle as shown in FIG. 2B as the determination criterion based on which a warning is issued to cause the vehicle to run within the running road.

In S305, the warning timing is determined. The warning timing is determined to issue a warning when a distance or arrival allowance time to the running road boundary in the direction determined as any one of the widthwise direction of the vehicle and the traveling direction of the vehicle in any one of S303 and S304 is smaller than or equal to the predetermined distance or time.

According to the above described routine, a distance or arrival allowance time to the running road boundary in any one of the widthwise direction of the vehicle and the traveling direction of the vehicle is selected as the determination criterion, based on which a warning is issued to cause the vehicle to run within the running road, on the basis of only the curvature radius of the running road, so, whatever is the curvature radius of the running road, it is possible to issue a warning so as to cause the vehicle to run within the running road in line with a collision risk felt by the driver.

Figure 6:
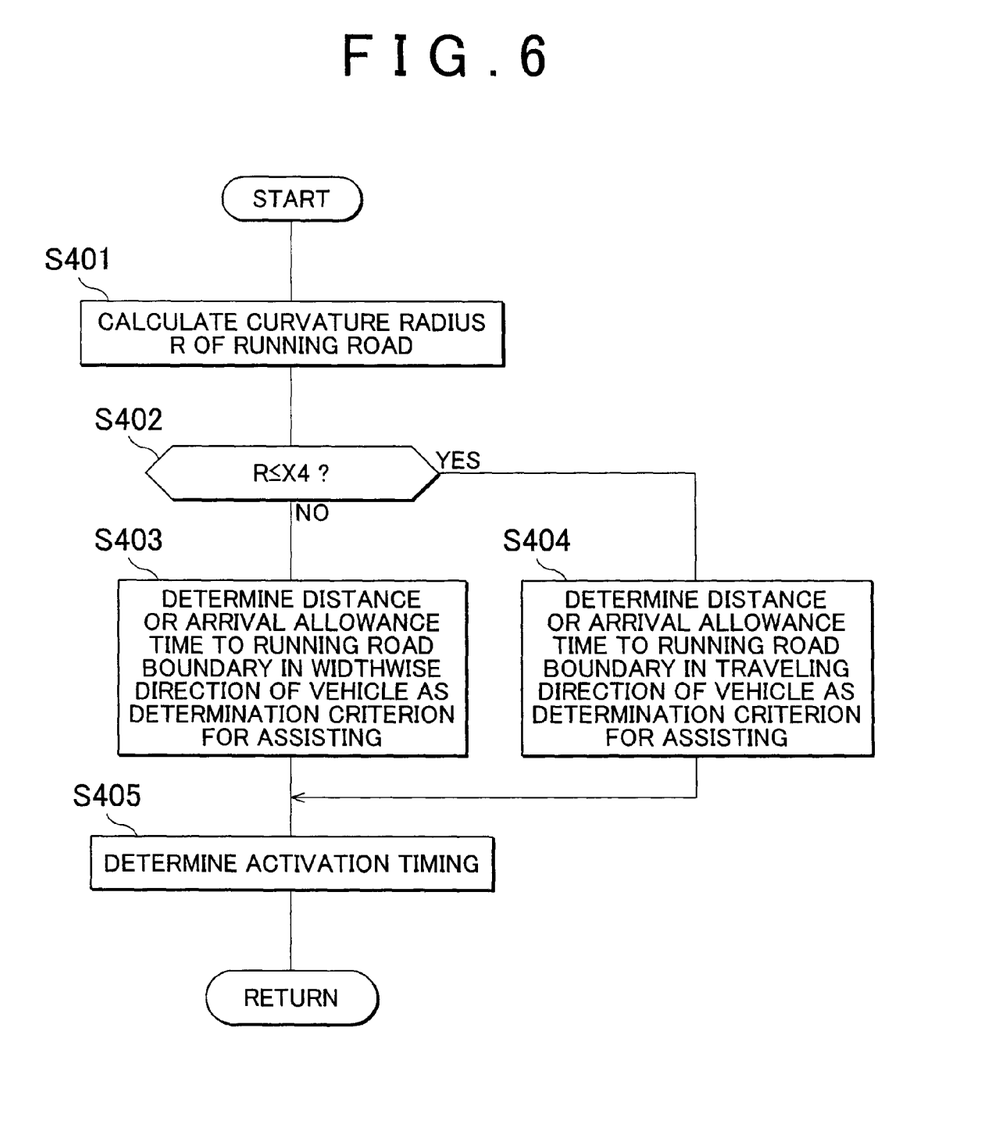
FIG. 6 is a flowchart that shows a second control determination control routine according to the alternative embodiment.

A second control determination control routine executed by the control determining unit 107 will be described with reference to the flowchart shown in FIG. 6. FIG. 6 is a flowchart that shows the second control determination control routine. The routine is repeatedly executed by the control determining unit 107 of the ECU 1 at predetermined intervals.

As the routine shown in FIG. 6 is started, the curvature radius R of the running road set by the integrated recognition processing unit 104 is calculated in S401.

It is determined in S402 whether the curvature radius R of the running road is smaller than or equal to a sixth threshold X4($m$). Here, the sixth threshold X4($m$) is a value by which the curvature radius of a running road is classified into any one of a large curvature radius and a small curvature radius, and is a value determined by an experiment, verification, or the like, in advance. The sixth threshold X4($m$) may be a fixed value or may be a variable value that varies in response to a vehicle speed, a yaw rate, or the like. When it is determined in S402 that the curvature radius R of the running road is not smaller than or equal to the sixth threshold X4($m$), the process proceeds to S403. When it is determined in S402 that the curvature radius R of the running road is smaller than or equal to the sixth threshold X4($m$), the process proceeds to S404.

In S403, it is determined to use a distance or arrival allowance time to a running road boundary in the widthwise direction of the vehicle as shown in FIG. 2A as the determination criterion based on which assisting is performed to cause the vehicle to run within the running road.

In S404, it is determined to use a distance or arrival allowance time to a running road boundary in the traveling direction of the vehicle as shown in FIG. 2B as the determination criterion based on which assisting is performed to cause the vehicle to run within the running road.

In S405, the activation timing is determined. The activation timing is determined to perform activation when a distance or arrival allowance time to the running road boundary in the direction determined as any one of the widthwise direction of the vehicle and the traveling direction of the vehicle in any one of S403 and S404 is smaller than or equal to the predetermined distance or time.

According to the above described routine, a distance or arrival allowance time to the running road boundary in any one of the widthwise direction of the vehicle and the traveling direction of the vehicle is selected as the determination criterion, based on which assisting is performed to cause the vehicle to run within the running road, on the basis of only the curvature radius of the running road, so, whatever is the curvature radius of the running road, it is possible to perform assisting so as to cause the vehicle to run within the running road in line with a collision risk felt by the driver.

Note that, in the above embodiments, the curvature radius of a running road is used as a parameter associated with the degree of curve of a running road; however, the degree of curve of a running road is not limited to the curvature radius of a running road. Another parameter that indicates the degree of curve of a running road may be used. The driving support apparatus according to the aspect of the invention is not limited to the above described embodiments; it may be modified in various forms without departing from the scope of the invention. In addition, the above embodiments are not only the embodiments of the driving support apparatus but also the embodiments of a driving support method.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A driving support apparatus comprising:
a controller that sets a running road, on which a vehicle is able to run, on the basis of a road marking that indicates a lane boundary or a prohibited area and that, when the vehicle deviates from the running road, issues a warning or performs assisting so as to cause the vehicle to run within the running road, the controller changing a determination criterion, based on which a warning is issued or assisting is performed so as to cause the vehicle to run within the running road, on the basis of a degree of curve of the running road, wherein when the degree of curve of the running road is larger than a curve degree threshold, the controller uses a distance or arrival allowance time to a boundary of the running road in a widthwise direction of the vehicle as the determination criterion based on which a warning is issued or assisting is performed so as to cause the vehicle to run within the running road; whereas when the degree of curve of the running road is smaller than or equal to the curve degree threshold, the controller uses a distance or arrival allowance time to a boundary of the running road in a traveling direction of the vehicle as the determination criterion based on which a warning is issued or assisting is performed so as to cause the vehicle to run within the running road.

2. The driving support apparatus according to claim 1, wherein the controller selects and uses any one of a distance or arrival allowance time to a boundary of the running road in a widthwise direction of the vehicle and a distance or arrival allowance time to a boundary of the running road in a traveling direction of the vehicle as the determination criterion based on which a warning is issued or assisting is performed so as to cause the vehicle to run within the running road.

3. The driving support apparatus according to claim 1, wherein the controller changes the determination criterion, based on which a warning is issued or assisting is performed so as to cause the vehicle to run within the running road, on the basis of a width of the running road.

4. The driving support apparatus according to claim 3, wherein, when the width of the running road is larger than a width threshold, the controller uses a distance or arrival allowance time to a boundary of the running road in a widthwise direction of the vehicle as the determination criterion based on which a warning is issued or assisting is performed so as to cause the vehicle to run within the running road; whereas, when the width of the running road is smaller than or equal to the width threshold, the controller uses a distance or arrival allowance time to a boundary of the running road in a traveling direction of the vehicle as the determination criterion based on which a warning is issued or assisting is performed so as to cause the vehicle to run within the running road.

5. A driving support method comprising:

setting a running road, on which a vehicle is able to run, on the basis of a road marking that indicates a lane boundary or a prohibited area;

issuing a warning or performing assisting so as to cause the vehicle to run within the running road when the vehicle deviates from the running road; and changing a determination criterion, based on which a warning is issued or assisting is performed so as to cause the vehicle to run within the running road, on the basis of a degree of curve of the running road, wherein when the degree of curve of the running road is larger than a curve degree threshold, using a distance or arrival allowance time to a boundary of the running road in a widthwise direction of the vehicle as the determination criterion based on which a warning is issued or assisting is performed so as to cause the vehicle to run within the running road; whereas when the degree of curve of the running road is smaller than or equal to the curve degree threshold, using a distance or arrival allowance time to a boundary of the running road in a traveling direction of the vehicle as the determination criterion based on which a warning is issued or assisting is performed so as to cause the vehicle to run within the running road.

* * * * *